UNITED STATES PATENT OFFICE.

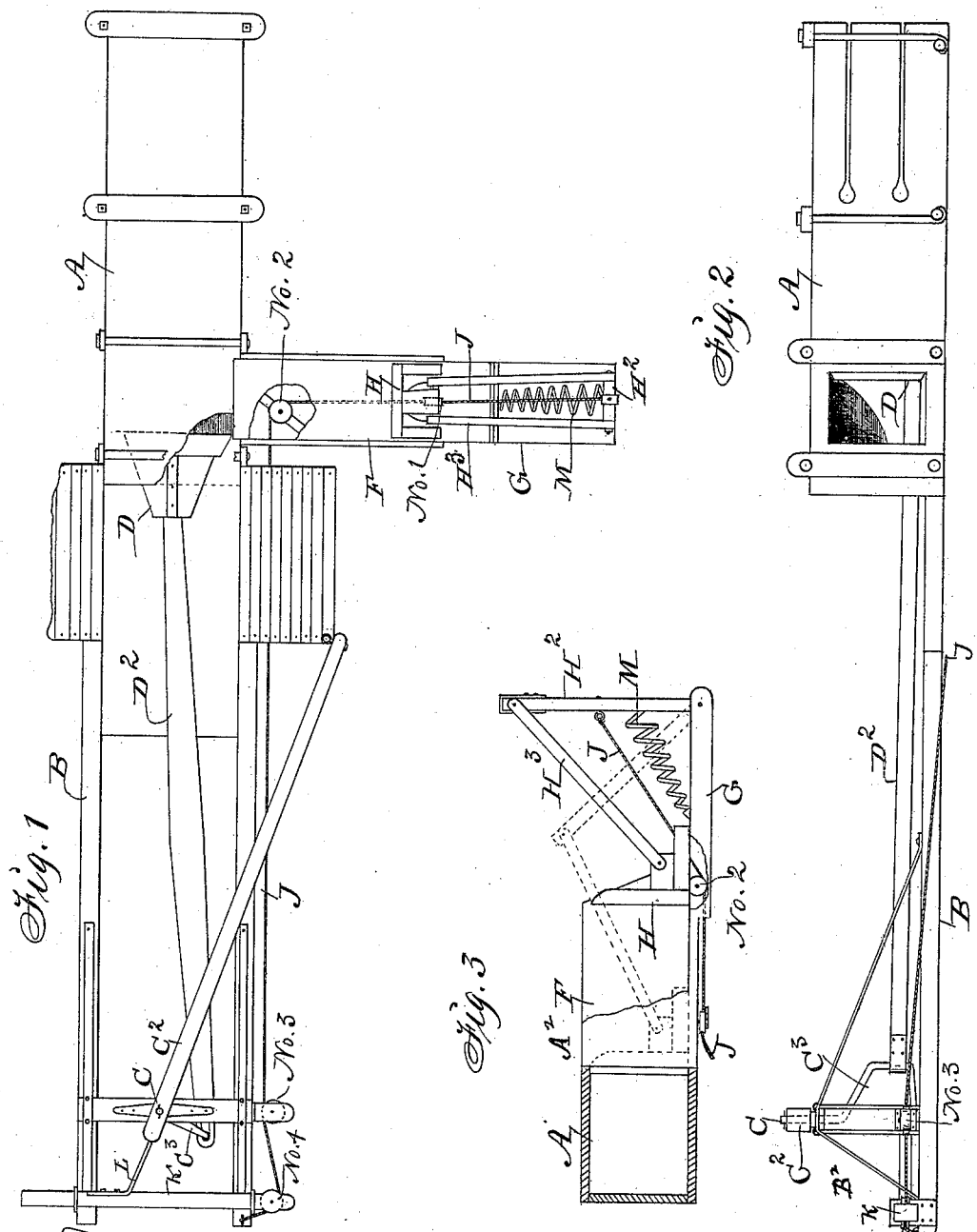

FRANCIS T. WILSON, OF GILBERT STATION, IOWA, ASSIGNOR OF THREE-FOURTHS TO FRANK B. GILBERT, EDWARD B. GILBERT, AND ELIAS GILBERT, ALL OF SAME PLACE.

SELF-FEEDING HAY-PRESS.

SPECIFICATION forming part of Letters Patent No. 358,637, dated March 1, 1887.

Application filed April 10, 1886. Serial No. 198,504. (No model.)

*To all whom it may concern:*

Be it known that I, FRANCIS T. WILSON, a citizen of the United States of America, and a resident of Gilbert Station, in the county of Story and State of Iowa, have invented a Self-Feeding Hay-Press, of which the following is a specification.

My object is to save time and labor in baling hay and other incompact materials; and my invention consists in the construction and combination of an oblong press-box having a side feed-opening at one end, horizontal slots and openings at its opposite end to admit bands or tying-wires, a frame to support a vertical shaft having a crank at its lower portion and a sweep at its top, a plunger connected with the crank of the shaft, a feed-box, and automatic packing mechanism, as hereinafter set forth, pointed out in my claims, and illustrated in the accompanying drawings, in which—

Figure 1 is a top view of my machine; Fig. 2, a side view showing the feed device removed, and Fig. 3 a side view of the feed device connected with the feed-opening of the press-box.

A represents an oblong open-ended press-box, that may vary in size, as desired. It has an opening, $A^2$, at its front end to admit hay, and slots in its sides at its rear end to admit wires or bands for binding bales in a common way.

B are the side pieces of an oblong frame, fixed to the bottom and front end of the press-box, to extend forward therefrom and to serve as a base to support the operative devices required to press loose hay from the front end of the press-box to its rear end to form bales by means of horse-power.

$B^2$ represents an auxiliary frame and sweep support fixed on top of the free end of the frame and base B, and securely stayed by means of braces extending from its upper corners in opposite directions to the side pieces, B, of the base.

C is a rotating shaft in a step fixed to the center and bottom of the frame B, and journaled in a bearing formed in or fixed to the top and center of the same frame in such a manner that it can be revolved by means of a sweep, $C^2$, fixed to its top.

$C^3$ is a lateral bend and crank at the lower portion of the shaft, to which a plunger, D, fitted in the press-box, is connected by means of a pitman, $D^2$, in such a manner that every revolution of a horse hitched to the free end of the sweep will, by means of the crank-shaft and pitman, reciprocate the plunger in the box, as required, to press the hay from the feed-opening toward its rear end to form a bale.

F represents an open-ended feed-box of oblong form, fitted over the opening $A^2$ of the press-box, to extend laterally at right angles.

G is a frame extending outward from the free end of the feed-box.

H is a right-angled slide or follower fitted in the feed-box.

$H^2$ is a frame pivoted to the free end of the frame G.

$H^3$ is a pitman pivoted to the free and top end of the frame $H^2$ and the follower H.

J is a rope fixed to the center portion of the frame $H^2$, and passed over directing-pulleys Nos. 1, 2, and 3 to a sliding bar, $k$, in bearings fixed on top of the free ends of the side pieces, B, of the base of the press. It is also passed over a pulley, No. 4, in the end of the bar, and then fastened to the side pieces, B.

L is an arm fixed to the sliding bar $k$, to project horizontally toward the shaft C, and to perform the function of a cam in moving the bar outward at every revolution of the horse, sweep, and shaft by means of the crank $C^3$, that comes in contact with the end of the arm; and each outward motion of the sliding bar thus produced draws the rope J over the pulleys 1 2 3, and thereby pulls the pivoted frame $H^2$ downward to push the follower H toward the press-box A, by means of the pitman $H^3$, as required, to push hay from the feed-box F into the press-box.

M represents a spring or series of springs connected with the base G and pivoted frame $H^2$ in such a manner that it will be compressed as the follower H is pushed forward in the press-box, and power stored therein sufficient to reverse the motion of the hinged frame H² and follower H immediately after the pressure of the crank C³ is relaxed from the arm L, carried by the sliding bar k, at the same time that the said crank pushes the plunger D rearward in the press-box, by means of the pitman D², to form a bale in the rear end of the box.

From the foregoing description of the construction and function of each element, the unitary actions of all the parts and the practical operation and utility of the complete machine will be obvious to persons familiar with baling-presses.

I am aware that a press-box has had an opening in one of its sides at the front end, and a feed-spout combined therewith to extend vertically; but a feed-box extending horizontally from a press-box and adapted for operating a follower or plunger therein is novel and greatly advantageous.

I claim as my invention—

1. In a hay-press, the combination of an open-ended press-box having a feed-opening in one of its sides, at the front end, and a feed-box extending horizontally at right angles from said feed-opening in the press-box, for the purposes stated.

2. The combination of an open-ended press-box having a feed-opening in one of its sides, a reciprocating plunger in the press-box, an open-ended feed-box having an open top and a follower fitted in the box, and mechanisms for operating the plunger in the press-box and the sliding follower in the feed-box in concert with each other, for the purposes stated.

3. The combination of the rotating shaft C, having a crank, C³, and the sliding bar K, having a fixed arm, L, for the purposes stated.

4. The feed-box F, having a fixed frame, G, the hinged frame H², the follower H, and pitman H³, the rope J, the pulleys 1 2 3, and the sliding bar K, arranged and combined with a hay-press, substantially as shown and described, for the purposes stated.

5. In a baling-press, the combination of an open-ended press-box having a feed-opening in one side and a reciprocating plunger on its inside and mechanism for operating the plunger, an open feed-box fitted over the feed-opening in the press-box having a slide or follower inside, and mechanism for operating the same in concert with the plunger in the press-box, in the manner set forth, for the purposes stated.

FRANCIS T. WILSON.

Witnesses:
L. OLIVER,
J. H. COOK.